US 12,491,999 B2

United States Patent
Bonnefoy

(10) Patent No.: US 12,491,999 B2
(45) Date of Patent: Dec. 9, 2025

(54) CONSOLE FOR A SEAT UNIT PROVIDED WITH A MOVABLE CLOSING PLATE FOR A STORAGE HOUSING

(71) Applicant: SAFRAN SEATS, Plaisir (FR)

(72) Inventor: Bastien Bonnefoy, Moissy Cramayel (FR)

(73) Assignee: Safran Seats, Plaisir (FR)

( * ) Notice: Subject to any disclaimer, the term of this patent is extended or adjusted under 35 U.S.C. 154(b) by 253 days.

(21) Appl. No.: 18/038,969

(22) PCT Filed: Nov. 10, 2021

(86) PCT No.: PCT/EP2021/081268
§ 371 (c)(1),
(2) Date: May 25, 2023

(87) PCT Pub. No.: WO2022/117299
PCT Pub. Date: Jun. 9, 2022

(65) Prior Publication Data
US 2023/0415896 A1    Dec. 28, 2023

(30) Foreign Application Priority Data

Dec. 3, 2020    (FR) ...................................... 2012276

(51) Int. Cl.
*B64D 11/06*    (2006.01)

(52) U.S. Cl.
CPC ...... *B64D 11/0605* (2014.12); *B64D 11/0636* (2014.12)

(58) Field of Classification Search
CPC ........................... B60N 2/793; B64D 11/0605; B64D 11/0627; B64D 11/0636; A47C 7/622

(Continued)

(56) References Cited

U.S. PATENT DOCUMENTS 3,136,578 A * 6/1964 Tihovici .................... A47C 7/72
                                                    297/188.19
8,419,124 B2 * 4/2013 Kramer .................. A61G 5/128
                                                    297/173

(Continued)

FOREIGN PATENT DOCUMENTS

FR          3011783 A1      4/2015
WO       2010081156 A1      7/2010
WO    WO-2016165980 A1 * 10/2016     ............. B60N 3/002

OTHER PUBLICATIONS

International Patent Application No. PCT/EP2021/081268, International Search Report and Written Opinion dated Feb. 25, 2022, 12 pages (10 pages of original document and 2 pages of English translation).

(Continued)

*Primary Examiner* — Jose V Chen
(74) *Attorney, Agent, or Firm* — Kilpatrick Townsend & Stockton LLP

(57) ABSTRACT

A console (13) for a sea unit (10) includes: —a storage housing (27) delimiting an internal space for accommodating objects, and—a plate (31) movable between a closed position in which the movable plate (31) closes the opening (28) of the storage housing (27) and an open position in which the movable plate (31) is disengaged from the opening (28) of the storage housing (27) to allow access to the internal space of the storage housing (27), —the movable plate (31) extending in a horizontal plane in the closed position and in the open position (28), the movable plate (31) being capable of being retained in the horizontal plane while the movable plate (31) is being moved from the closed position to the open position and vice versa.

9 Claims, 3 Drawing Sheets

(58) Field of Classification Search
USPC .......................................... 108/26; 297/188.19
See application file for complete search history.

(56) References Cited

U.S. PATENT DOCUMENTS

| | | | | |
|---|---|---|---|---|
| 10,285,505 | B2* | 5/2019 | Summerville | ........... A47C 7/70 |
| 2010/0066113 | A1 | 3/2010 | Browne et al. | |
| 2013/0249256 | A1* | 9/2013 | Payne, Jr. | ............ A47C 7/624 |
| | | | | 297/161 |
| 2015/0284088 | A1* | 10/2015 | Gow | ................ B64D 11/0605 |
| | | | | 108/44 |
| 2016/0375810 | A1* | 12/2016 | Kong | .................... B60N 2/793 |
| | | | | 297/145 |
| 2018/0127099 | A1 | 5/2018 | Ducreux et al. | |
| 2020/0189743 | A1* | 6/2020 | Hansson | ............ B64D 11/0015 |
| 2020/0406823 | A1* | 12/2020 | An | ........................ B60N 2/773 |

OTHER PUBLICATIONS

International Patent Application No. PCT/EP2021/081268, English Translation of the Written Opinion of the International Searching Authority, dated May 30, 2023.

* cited by examiner

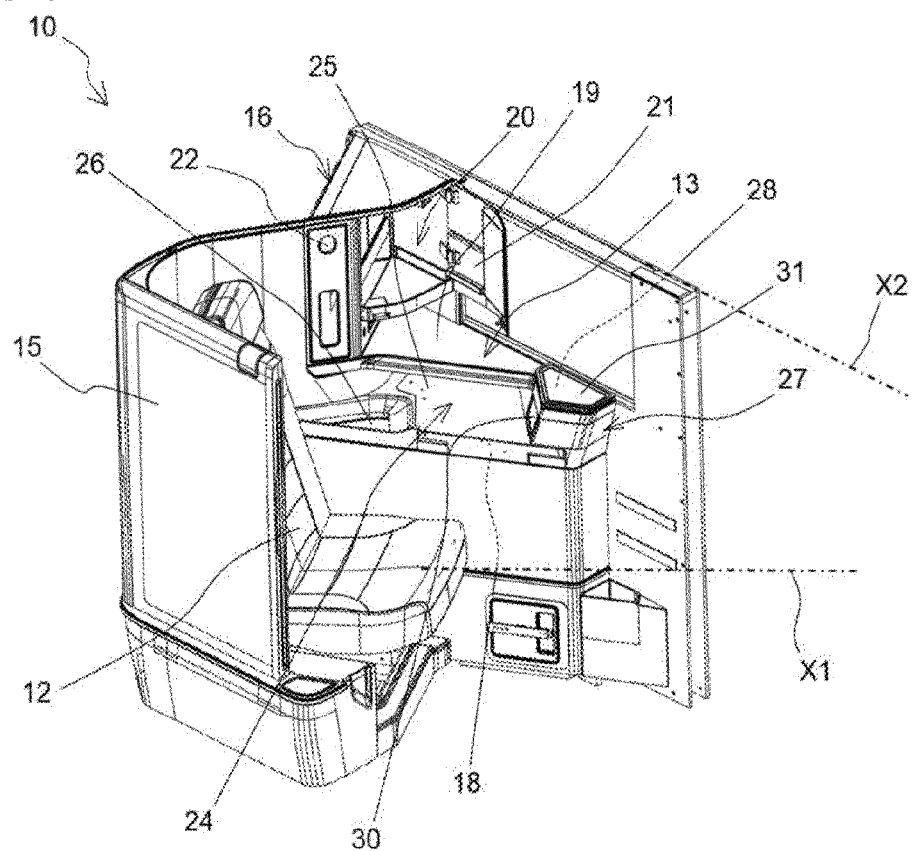
[Fig. 1]
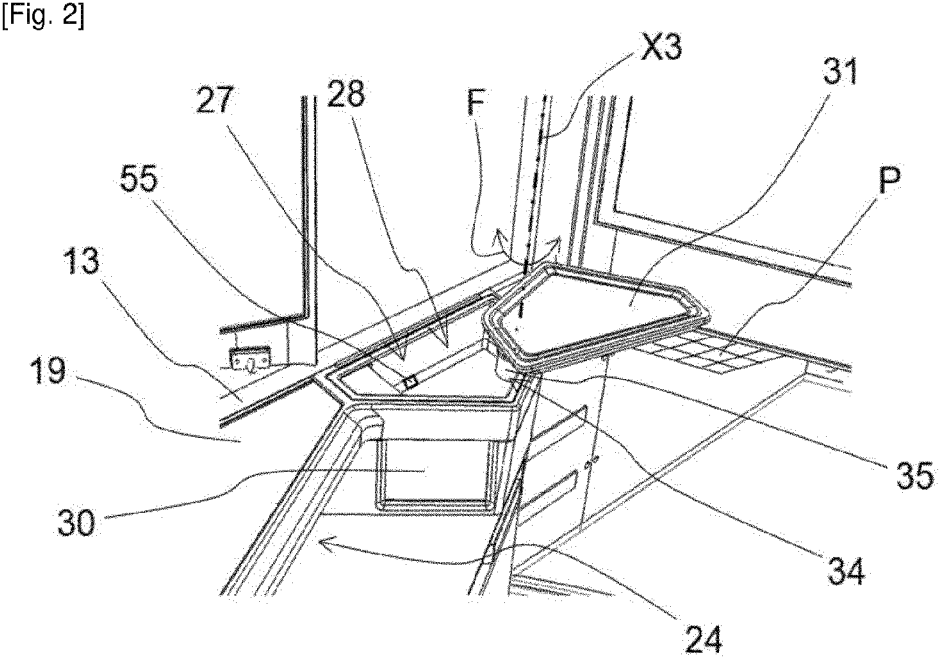
[Fig. 2]

[Fig. 3]
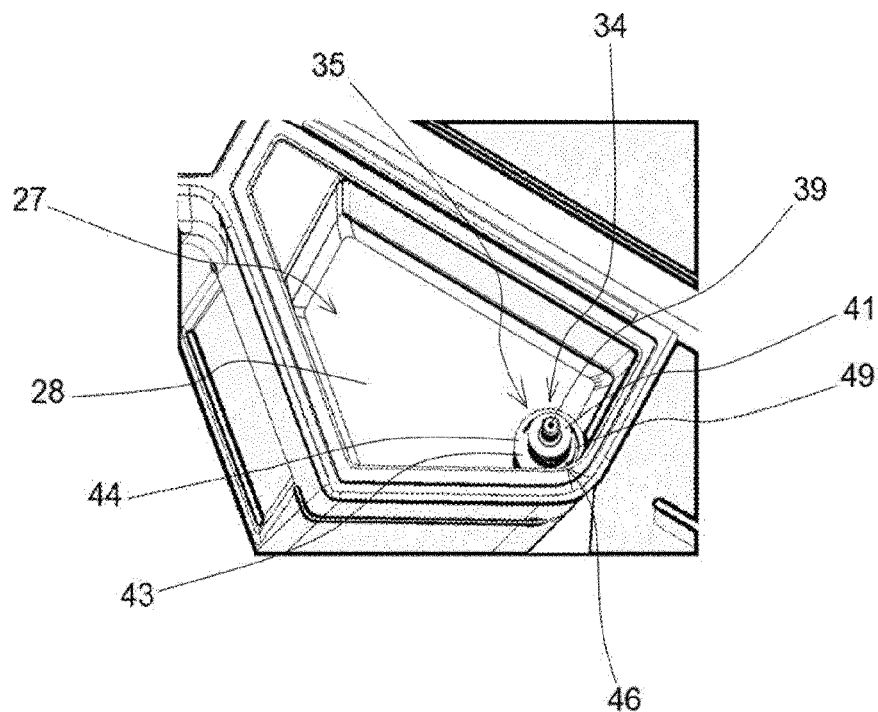
[Fig. 4]
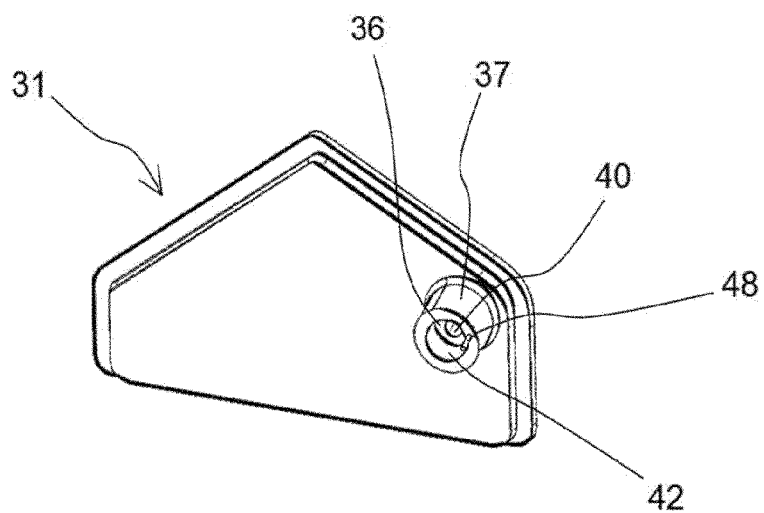

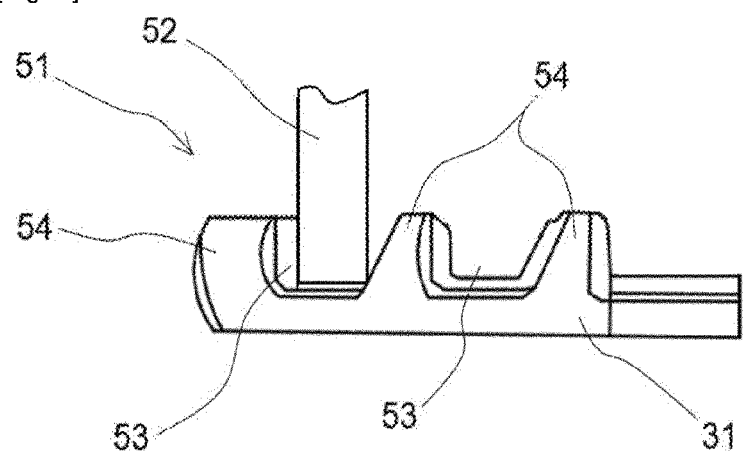
[Fig. 5]

CONSOLE FOR A SEAT UNIT PROVIDED WITH A MOVABLE CLOSING PLATE FOR A STORAGE HOUSING

The present invention relates to a console for a seat unit provided with a mobile closing plate for a storage housing. The invention finds a particularly advantageous application with seating units of "business class" and "first class" type.

In a manner known per se, such a seat unit comprises a seat associated with a side console provided with storage compartments and with a shell extending at least partly around the seat so as to delimit a semi-enclosed space around the passenger. Such a configuration makes it possible to guarantee the privacy of the passenger on the seat.

The seat offers the passenger different positions of comfort, from a "seated" position to a "lying" position, in which the seat defines a substantially horizontal sleeping surface so that the passenger can lie down. Intermediate comfort positions are also offered, such as the "relax" position in which the seat back is strongly reclined. Generally, these intermediate positions are obtained by the inclination of the pivoting seat back about a horizontal axis perpendicular to an axis of extension of the seat. The passenger can then remain on the seat during transitions between the different positions. The seat generally consists in particular of the seat back and a seating surface and can comprise a legrest and/or a footrest, which can be fixed or linked to a seat kinematics.

The enclosed storage compartments on the seat console can be arranged in a vertical arrangement and be accessible via a storage door movable about a vertical axis. These storage compartments can also be arranged in a horizontal arrangement and be accessible via a flap movable about a horizontal axis. However, the movable walls of the storage compartments have no other function than to allow access to or close these storage compartments.

The invention aims in particular to effectively remedy this drawback by proposing a console for a seat unit comprising:
- a storage housing delimiting an internal volume inside which objects can be placed,
- said storage housing comprising an opening leading outside said storage housing in a vertical direction, and
- a plate movable between a closed position in which the movable plate closes the opening of the storage housing and an open position in which said movable plate is disengaged from the opening of the storage housing to allow access to the internal volume of said storage housing,
- said movable plate extending in a horizontal plane in the closed position and in the open position, said movable plate being adapted to be maintained in said horizontal plane during movement of said movable plate from the closed position to the open position and vice versa, characterized in that the storage housing extends vertically between a horizontal face having in particular an armrest function and an upper wall forming a table surface.

The invention thus makes it possible, thanks to the movable plate for closing the storage compartment maintained in a horizontal plane, to use this movable plate as a support on which the passenger can place objects such as a glass, an electronic device laptop (mobile phone, tablet), or any other object, regardless of the position of the mobile plate. The invention also allows access to the storage housing without having to remove the object placed on the mobile plate.

According to one embodiment of the invention, in the closed position and in the open position, the movable plate is located in the same horizontal plane as the upper wall forming the table surface.

According to one embodiment of the invention, in the closed position, the movable plate is located in an extension of the upper wall forming the table surface.

According to one embodiment of the invention, the plate is rotatable from one position to another by means of a pivot connection with a vertical axis.

According to one embodiment of the invention, the pivot connection is formed by a vertical pin cooperating with a cavity of corresponding shape in a cylindrical portion integral with the plate.

According to one embodiment of the invention, the console comprises a device for limiting an angular displacement of the mobile plate.

According to one embodiment of the invention, the device for limiting an angular displacement of the mobile plate comprises a toe mechanically linked to the plate cooperating with a arc-shaped groove in a shoulder of the pin so that at the least one end of the groove constitutes a displacement stop for the toe so as to limit an angular displacement of the movable plate when passing from the closed position to the open position.

According to one embodiment of the invention, the console comprises a light source able to provide illumination for the internal volume of the storage housing.

According to one embodiment of the invention, the mobile plate comprises a device for holding a portable electronic device.

The invention also relates to a seat unit comprising a seat and a console as previously defined.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, in which:

FIG. 1 is a perspective view of a seat unit comprising a console according to the invention provided with a storage housing associated with a movable plate in the closed position;

FIG. 2 is a detailed perspective view of a storage housing of a console according to the invention provided with a movable plate in the open position;

FIG. 3 is a perspective view from the top of a storage housing of a console according to the present invention;

FIG. 4 is a perspective view from below of a movable plate associated with a storage housing of a console according to the invention;

FIG. 5 is a side view of a device for holding a portable electronic device that can be integrated on a mobile plate according to the invention.

It should be noted that the structural and/or functional elements common to the different embodiments have the same references. Thus, unless otherwise stated, such elements have identical structural, dimensional and material properties.

Furthermore, in the remainder of the description, the relative terms of the "horizontal" or "vertical" type are understood by reference to the common meaning given to them by a passenger on a seat with which the console according to the invention is associated.

FIG. 1 shows a seat unit 10 comprising a seat 12 associated with a side console 13 extending along one side of the seat 12. In addition, a shell 15 extends at least partially around the seat 12 so as to delimit a semi-enclosed space around the passenger. Such a configuration makes it possible to guarantee the privacy of the passenger on the seat 12. A video screen 16 of a multimedia system or IFE (Inflight Entertainment System) can be installed on a rear part of the privacy shell 15 so as to be usable by a rear passenger.

The seat unit 10 may also conventionally comprise a meal flap 18 movable between a stored position (corresponding to that shown in FIG. 1) in which the meal flap 18 is located inside a housing in the console 13 and a deployed position in which the meal flap 18 is outside the housing.

The seat 12 is advantageously provided with a kinematic so as to be movable between a "seated" position, in which the seat 12 is configured to define a seated position for a passenger, and an "elying" position, in which the seat 12 is configured to define a sleeping surface for the passenger, advantageously substantially horizontal. Intermediate comfort positions are also offered, such as the "relax" position in which the seat back is strongly reclined.

The seat 12 has an axis of extension X1 defined by the intersection of a horizontal plane and a vertical median plane of the seat 12 corresponding to a plane of symmetry of the seat 12. The axis of extension X1 of the seat 12 may form a non-zero angle with respect to a direction parallel or coincident with a central axis X2 of the aircraft. In this case, the seat 12 is turned towards the axis X2. As a variant, the seat 12 could be turned in an opposite direction relative to the axis X2.

In the example shown, the console 13 comprises an upper wall 19 of horizontal orientation. The upper wall 19 forms a table surface on which a passenger can place objects. On the side of its rear end, a vertical storage space 20 may be provided comprising one or more elements from among a literature pocket, a bottle holder, or a minibar. The choice of storage compartments is configurable according to the wishes of the airline. The storage space 20 is closed by a hinged door 21 with a vertical axis. The console 13 may also include a reading light 22 intended to direct light towards the seat 12.

Furthermore, a cavity 24 is located under the upper wall 19. The cavity 24 is open laterally towards the seat 12 with which the console 13 is associated.

In addition, a horizontal face 25 of the console 13 has in particular an armrest function. The horizontal face 25 may locally have a curved cuff shape 26 matching the shape of part of the passenger's arm. The upper wall 19 has a recess in a side edge to allow the passenger easy access to the cuff shape 26.

Furthermore, the console 13 includes a storage housing 27 delimiting an internal volume inside which the passenger can place objects, in particular valuables, such as jewelry or a watch.

Storage housing 27 is provided with an opening 28 leading outside said storage housing 27 in a vertical direction. The storage housing 27 extends vertically between on the one hand the horizontal face 25 having the function of armrest and on the other hand the upper wall 19 forming a table surface.

In this case, the storage housing 27 is arranged in the front part of the console 13. In its rear part, the storage housing 27 is delimited by a wall carrying a control unit 30 for the seat 12 and its environment (known as "PCU" for "Passenger Control Unit"). The control unit 30 allows the passenger in particular to control the selection of a position of the seat 12 as well as the environment of the seat 12, namely a video system, a heating device, a lighting atmosphere, or any other parameter of the seat environment 12.

A plate 31 is movable between a closed position in which the movable plate 31 closes the opening 28 in the storage housing 27 as shown in FIG. 1 and an open position in which said movable plate 31 is disengaged from the opening 28 in the storage housing 27 to allow access to the internal volume of said storage housing 27, as shown in FIG. 2. In the closed position, the movable plate 31 does not interfere with the internal volume of the storage housing 27.

The mobile plate 31 may be made from a plate out of a plastic material or a painted metallic material, in particular an aluminum material. The movable plate 31 extends in a horizontal plane P in the closed position and in the open position 28. The movable plate 31 is adapted to be maintained in said horizontal plane P during a displacement of said movable plate 31 from the closed position to the open position and vice versa.

In the closed position and in the open position, the movable plate 31 is located in the same horizontal plane P as the upper wall 19 forming the table surface. In the closed position, the movable plate 31 is located in an extension of the upper wall 19, that is to say there is a surface continuity between the movable plate 31 and the upper wall 19.

The plate 31 is rotatable from one position to another along the arrow F via a pivot connection 34 of vertical axis X3. As can be seen in FIG. 3, the pivot connection 34 is formed by a vertical pin 35 provided with one end cooperating with a cavity 36 of corresponding shape in a cylindrical portion 37 integral with the plate 31 (see FIG. 4).

In this case, the pin 35 comes from a bottom of the storage housing 27. The pin 35 preferably has a stepped diameter. The pin 35 thus comprises an end section 39 of small diameter intended to be inserted inside a space 40 of the cavity 36 of corresponding diameter. A section 41 of intermediate diameter is intended to be inserted inside a space 42 of the cavity 36 of corresponding diameter. The pin 35 also includes a section 43 of large diameter (compared to the other two sections 39 and 41). A difference in diameter between the section 41 of intermediate diameter and the section 43 of large diameter forms a shoulder 44.

In addition, a device 46 is preferably provided for limiting an angular displacement of the movable plate 31. The device 46 for limiting an angular displacement of the movable plate 31 comprises a toe 48 mechanically linked to the plate 31 cooperating with an arc-shaped groove 49 in the shoulder of the pin 35, so that at least one end of the groove 49 constitutes a displacement stop for the toe 48 so as to limit an angular displacement of the plate 31 during of its passage from the closed position to the open position. In this case, the toe 48 comes from an end face of the cylindrical portion 37.

As a variant, the mobile plate 31 could move with a translational movement to pass from one position to another. Alternatively, the plate 31 can move with a combined movement of rotation and translation from one position to another. As a variant, the mobile plate 31 could be mounted on a telescopic arm.

The mobile plate 31 may also include a device 51 for holding a portable electronic device 52, such as a digital tablet or a mobile phone of the Smartphone type. As illustrated by FIG. 5, the holding device 51 comprises at least one groove 53 for receiving an edge of the portable electronic device 52. The groove 53 could for example be defined by two adjacent teeth 54 projecting from an upper face of the movable plate 31.

As a variant, the mobile plate 31 may comprise holding toes to be arranged on either side of the portable electronic device 52 according to its thickness. As a variant, the holding device 51 may also include jaws capable of gripping the portable electronic device 52 on its side edges.

In order to obtain an aesthetic effect, in particular when the aircraft cabin is in a night mode, the console 13 comprises at least one light source 55 visible in FIG. 2, such as a lamp or a light guide, providing illumination of the internal volume of the storage housing 27. The internal walls of the storage housing 27 may be covered with a soft material such as suede or leather in order to give a good finishing quality to the storage housing 27 which may be used by the passenger to place precious objects such as jewelry or watches.

In the example represented, the mobile plate 31 as well as the storage housing 27 has a pentagonal shape. As a variant, the plate 31 as well as the storage housing 27 may have any other shape adapted to the configuration of the console 13, in particular a round, square, triangular, rectangular, hexagonal shape, any other polygonal or rounded shape.

Of course, the different features, variants and/or embodiments of the present invention can be associated with each other in various combinations insofar as they are not incompatible with or exclusive from one another.

Furthermore, the invention is not limited to the embodiments described above and provided solely by way of example. It encompasses various modifications, alternative forms and other variants that a person skilled in the art may consider in the context of the present invention and in particular all combinations of the various modes of operation described previously, which may be taken separately or in combination.

The invention claimed is:

1. A console for a seat unit comprising:
 a storage housing delimiting an internal volume inside which objects can be placed,
 the storage housing comprising an opening leading outside said storage housing in a vertical direction, and
 a mobile plate movable between a closed position in which the mobile plate closes the opening in the storage housing and an open position in which said mobile plate is disengaged from the opening in the storage housing to allow access to the internal volume of said storage housing,
 said mobile plate extending in a horizontal plane (P) in the closed position and in the open position, said mobile plate being adapted to be maintained in said horizontal plane (P) during a movement of said mobile plate from the closed position to the open position and vice versa, characterized in that:
 the storage housing extends vertically between a horizontal face configured as an armrest and an upper wall forming a table surface; and
 in the closed position and in the open position, the mobile plate is in the same horizontal plane (P) as the upper wall forming the table surface.

2. The console according to claim 1, characterized in that, in the closed position, the mobile plate is located in an extension of the upper wall forming the table surface.

3. The console according to claim 1, characterized in that the mobile plate is rotatable from one position to another via a pivot connection with a vertical axis (X3).

4. The console according to claim 3, characterized in that the pivot connection is formed by a vertical pin cooperating with a cavity of corresponding shape in a cylindrical portion integral with the mobile plate.

5. The console according to claim 4, further comprising a device for limiting an angular displacement of the mobile plate.

6. The console according to claim 5, characterized in that the device for limiting the angular displacement of the mobile plate comprises a toe mechanically linked to the mobile plate cooperating with an arc-shaped groove in a shoulder of the vertical pin so that at least one end of the arc-shaped groove constitutes a displacement stop for the toe so as to limit the angular displacement of the mobile plate during its passage from the closed position to the open position.

7. The console according to claim 1, further comprising at least one light source able to provide illumination of the internal volume of the storage housing.

8. The console according to claim 1, characterized in that the mobile plate comprises a device for holding a portable electronic device.

9. A seat unit comprising a seat and the console as defined in claim 1.

* * * * *